US011821578B2

(12) United States Patent
Bélanger

(10) Patent No.: US 11,821,578 B2
(45) Date of Patent: Nov. 21, 2023

(54) HORIZONTAL PORTION OF A FRAME IN A STUD WALL AND INSTALLATION TOOL THEREFOR

(71) Applicant: Ghislain Bélanger, Rivière-des-Prairies (CA)

(72) Inventor: Ghislain Bélanger, Rivière-des-Prairies (CA)

(*) Notice: Subject to any disclaimer, the term of this patent is extended or adjusted under 35 U.S.C. 154(b) by 0 days.

(21) Appl. No.: 17/702,442

(22) Filed: Mar. 23, 2022

(65) Prior Publication Data

US 2022/0214011 A1    Jul. 7, 2022

Related U.S. Application Data

(63) Continuation-in-part of application No. 15/931,321, filed on May 13, 2020, now abandoned.

(60) Provisional application No. 62/847,265, filed on May 13, 2019.

(51) Int. Cl.
| | | |
|---|---|---|
| *E06B 1/02* | (2006.01) | |
| *E04G 21/18* | (2006.01) | |
| *F16M 13/02* | (2006.01) | |
| *E04F 21/00* | (2006.01) | |

(52) U.S. Cl.
CPC ....... *F16M 13/022* (2013.01); *E04F 21/0007* (2013.01); *E04G 21/1841* (2013.01); *E04G 21/1891* (2013.01); *E06B 1/02* (2013.01)

(58) Field of Classification Search
CPC ............ E04G 21/1841; E04G 21/1891; E04G 21/1858; E06B 1/02; E04C 2003/023; E04C 2003/026; Y10S 52/01; Y10S 52/04; Y10S 52/08; Y10S 269/904; E04F 21/0007

USPC ................. 52/127.2, 749.1, DIG. 1; 33/613; 269/41, 904

See application file for complete search history.

(56) References Cited

U.S. PATENT DOCUMENTS

| | | | | |
|---|---|---|---|---|
| 2,575,595 | A * | 11/1951 | Rienecker | E04G 21/1891 269/319 |
| 3,369,333 | A * | 2/1968 | Wheeler | F16B 7/00 52/657 |
| 3,963,230 | A * | 6/1976 | Jankowski, Jr. | B25B 5/14 269/254 R |
| 4,720,957 | A * | 1/1988 | Madray | E04B 1/24 52/846 |
| 5,590,505 | A * | 1/1997 | Bogle | E04C 3/292 52/836 |
| 5,625,997 | A * | 5/1997 | Callahan | E04B 2/766 52/847 |

(Continued)

FOREIGN PATENT DOCUMENTS

| | | | | |
|---|---|---|---|---|
| CN | 108331252 | A * | 7/2018 | ............... E04B 1/76 |
| CN | 108331252 | A | 7/2018 | |

(Continued)

*Primary Examiner* — Ryan D Kwiecinski
(74) *Attorney, Agent, or Firm* — PRAXIS

(57) ABSTRACT

A horizontal portion of a frame, as a door header, of a predetermined length for installation between two adjacent studs of a stud wall spaced from one another. An installation tool, releasably mounted on a respective stud via a magnetic attachment, supports a respective end of the horizontal portion adjacent the metallic stud during attachment of the horizontal portion to the stud. A kit formed of at least one horizontal portion and at least one installation tool is also provided.

13 Claims, 3 Drawing Sheets

(56) References Cited

U.S. PATENT DOCUMENTS

| | | | | |
|---|---|---|---|---|
| 5,802,782 A * | 9/1998 | Jewell | E04C 3/02 | 52/204.2 |
| 5,964,073 A * | 10/1999 | Harper | E04G 21/20 | 52/DIG. 1 |
| 6,029,407 A * | 2/2000 | Schillero, Jr. | E04G 21/26 | 52/DIG. 1 |
| 6,230,466 B1 * | 5/2001 | Pryor | F16B 9/058 | 403/231 |
| 6,412,247 B1 * | 7/2002 | Menchetti | E04C 3/34 | 52/843 |
| 6,609,344 B2 * | 8/2003 | Saldana | E04B 5/14 | 52/696 |
| 8,117,802 B1 * | 2/2012 | Kisch | E04C 3/02 | 52/844 |
| 8,418,425 B1 * | 4/2013 | Santini | E04H 3/28 | 52/690 |
| 8,448,348 B1 * | 5/2013 | Jones | E04G 21/1891 | 33/760 |
| 2008/0282633 A1 * | 11/2008 | Buckholt | E04B 1/78 | 52/745.19 |
| 2011/0083336 A1 * | 4/2011 | Pianetto | E04G 21/1891 | 33/613 |
| 2016/0018206 A1 * | 1/2016 | Hollis | G01C 9/28 | 33/354 |
| 2018/0195300 A1 * | 7/2018 | Gillespie | E04G 21/1891 | |
| 2020/0386005 A1 * | 12/2020 | Bélanger | E04G 21/1858 | |

FOREIGN PATENT DOCUMENTS

| | | | | |
|---|---|---|---|---|
| FR | 2805840 A1 * | 9/2001 | | E04F 21/0015 |
| GB | 2302704 A * | 1/1997 | | E04G 21/20 |
| JP | 08312059 A * | 11/1996 | | |
| JP | 08312059 A | 11/1996 | | |
| JP | 10317563 A * | 12/1998 | | |
| JP | 10317563 A | 12/1998 | | |
| JP | 2000226897 A * | 8/2000 | | |

\* cited by examiner

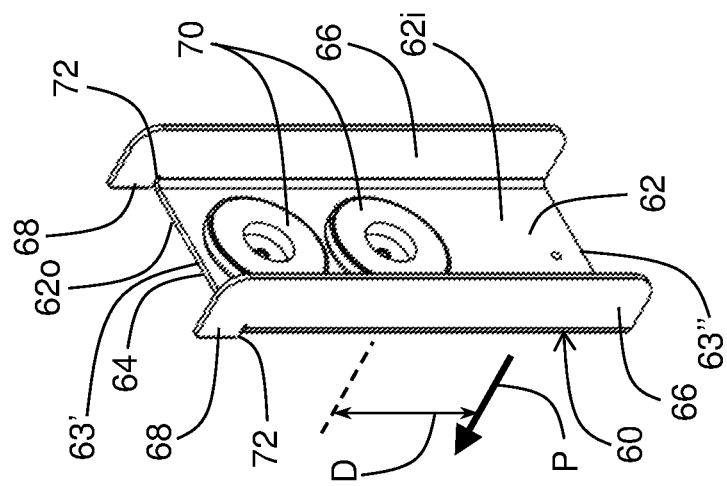
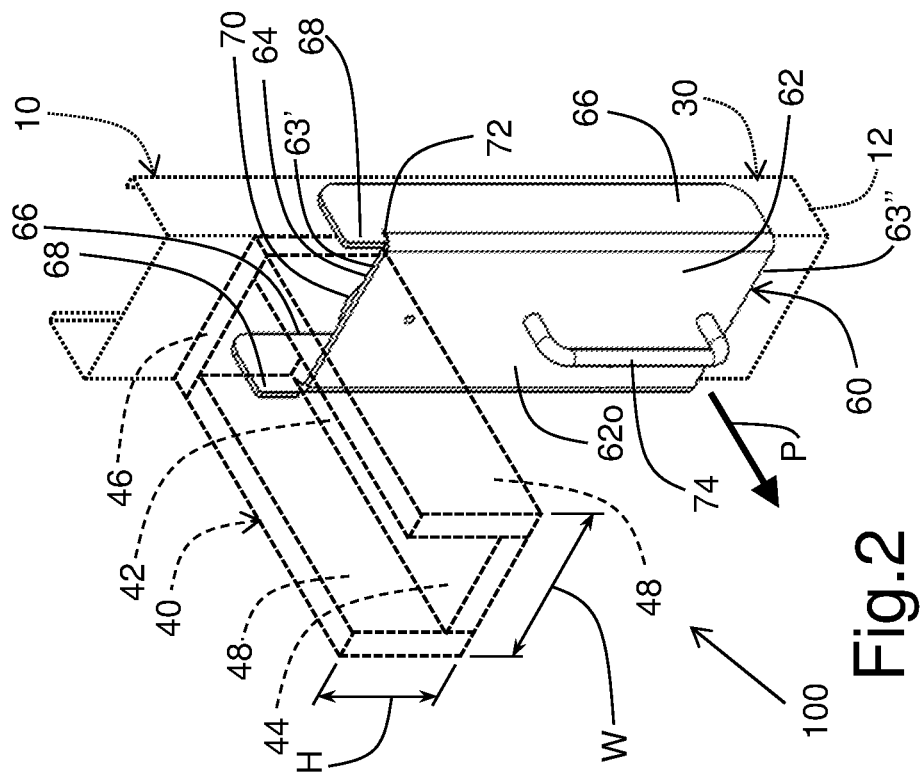

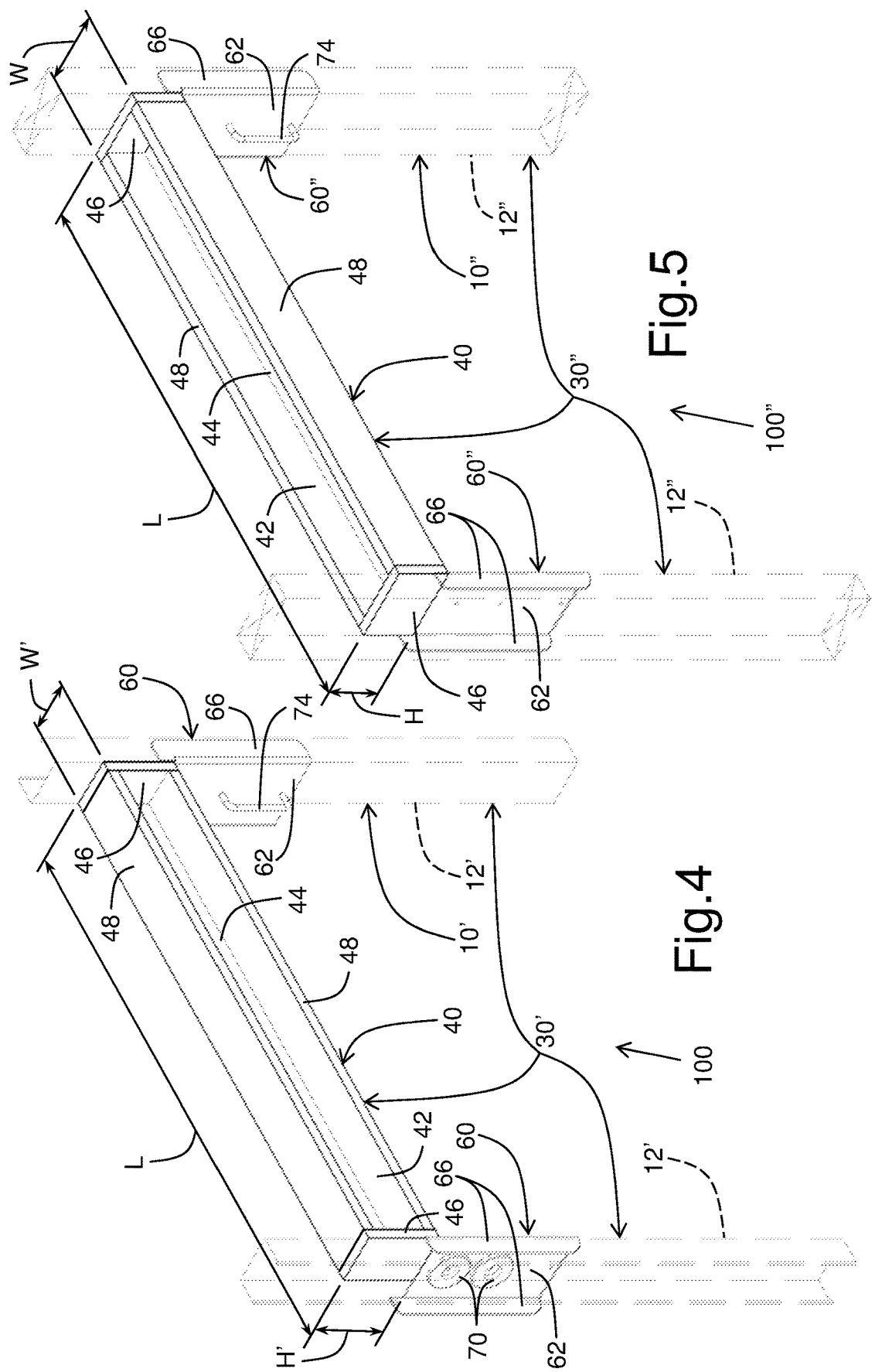

HORIZONTAL PORTION OF A FRAME IN A STUD WALL AND INSTALLATION TOOL THEREFOR

CROSS REFERENCE TO RELATED APPLICATIONS

This application is a continuation-in-part application of U.S. patent application Ser. No. 15/931,321 filed May 13, 2020, and which claims priority of U.S. Provisional Application for Patent No. 62/847,265 filed May 13, 2019, the content of both of which are incorporated herein by reference in their entirety.

FIELD OF THE INVENTION

The present invention relates to wall construction, and in particular to a horizontal portion of a frame defining an opening in a stud wall, and a tool (or template) for the installation of the horizontal portion.

BACKGROUND OF THE INVENTION

Use of U-shaped metal studs in the assembly of stud walls in building construction is well known in the art. Typically, such stud walls include a plurality of spaced apart vertical studs mounted between a floor bottom horizontal stud and a ceiling top horizontal stud. When an opening has to be defined in the stud wall, for a doorway or a window for examples, each opening is defined with a frame. In the case of a doorway, the two vertical studs forming the frame are spaced from one another with a predetermined distance, and a top horizontal portion of the frame, more commonly known as a door header, is placed therebetween at a predetermined height, while the floor bottom stud is typically removed therebetween. In the case of a window opening, the two vertical studs forming the frame are spaced from one another with a predetermined distance, and top and bottom horizontal portions of the frame (or header and sill) are placed therebetween at respective predetermined heights.

However, the installation of these horizontal portions of the frames is usually very time consuming (in the order of 10-15 minutes in average), which is in turn very costly, especially when considering that a single apartment may include at least ten doors and a few windows and that a building under construction includes tens or hundreds of such apartments. In fact, each horizontal portion of a frame requires the skilled technician to first cut the piece at the predetermined width and then to install it at the exact predetermined height (and in a perfect horizontal orientation) by securing it to the two vertical studs defining the frame. The installation requires the technician to first mark the proper location on the vertical studs and then secure the horizontal portion of the frame thereto while holding it in place, which could be really cumbersome and time consuming, depending on the length, and sometimes the weight, of the horizontal portion.

Accordingly, there is a need for an improved horizontal portion of a frame in a stud wall and an installation tool therefor.

SUMMARY OF THE INVENTION

It is therefore a general object of the present invention to provide an improved horizontal portion of a frame in a stud wall and an installation tool therefor, that obviate the above-mentioned problems and drawbacks.

An advantage of the present invention is that the horizontal portion as predetermined body length and predetermined body width, and preferably a predetermined body height different than the body width.

Another advantage of the present invention is that the horizontal portion is made of wooden material, preferably commonly known plywood material in order to be structurally strong and rigid, while offering a good body to secure to. The two longitudinal end walls allowing a firm securing of the horizontal portion to the supporting vertical studs.

Still another advantage of the present invention is that the installation tool is easy to used, removably securing to the, preferably metallic, vertical stud at an easily adjustable desired height, preferably via a level mark indicating the horizontal portion support level that is aligned to a positioning indicator (such as a projection from a laser alignment device or the like).

Yet another advantage of the present invention is that the installation tool, preferably in use with metallic vertical studs, has magnet(s) located adjacent one of the two longitudinal ends of the tool (preferably adjacent the supporting surface side) while the working handle is located adjacent the other one of the two longitudinal ends, such that when the user pulls on the tool via the handle. Therefore, the relative positioning of the handle relative to the magnet(s) provides for a lever arm to the pulling forces applied on the handle to help release the magnet(s) from the metallic stud. The magnets are typically strong enough to allow the tool to support a horizontal portion of a frame without any displacement of the tool relative to the metallic stud.

Yet a further advantage of the present invention is that the installation tool has a relative lengthwise opposite positioning of the handle relative to the magnet(s) that allows for the easy alignment of the supporting surface of the tool with a laser projection on the metallic vertical stud, with the tool being angled relative to the stud (with the supporting surface closer to the stud than the opposite longitudinal end of the tool carrying the handle) when approaching the supporting surface to the projection such that only a portion of the magnet(s) will secure the tool to the stud before the handle is approached closer to the stud for a complete securing of the tool using the whole magnet(s).

According to an aspect of the present invention, there is provided a horizontal portion of a frame defining an opening in a stud wall having two adjacent vertical studs spaced from one another by a predetermined distance and each having a stud width, the horizontal portion comprising:

an elongate body including at least a wooden bottom wall secured to first and second wooden end walls opposite to one another, the elongate body having a body length generally equal to the predetermined distance and a body width generally equal to the stud width, the first and second end walls being securable to the two adjacent studs, the body width being one of the notional 2×6, 2×4 or 2×3 stud widths.

In one embodiment, the elongate body includes a wooden lateral wall generally perpendicular to the bottom wall and extending between the first and second end walls, said lateral wall being secured to the bottom wall and to the first and second end walls and defining a body height, the body height being one of the notional 2×6, 2×4 or 2×3 stud widths.

In one embodiment, the elongate body includes first and second wooden lateral walls generally perpendicular to the bottom wall and extending between the first and second end walls, said first and second lateral wall being secured to the bottom wall on opposite sides thereof and to the first and second end walls and defining a body height, the body height being one of the notional 2×6, 2×4 or 2×3 stud widths.

According to another aspect of the present invention, there is provided a tool for the installation of a horizontal portion of a frame between two adjacent vertical metallic studs, the tool comprising:
  a main wall defining an outer surface and an inner surface thereof, a first longitudinal end of the main wall including a support surface for supporting a longitudinal end of the horizontal portion thereon;
  first and second side walls being parallel to one another and depending from the main wall away from the inner surface, the main wall and the first and second side walls forming an open channel for removably receiving one of the two adjacent studs therein, the support surface extending at least partially between the first and second side walls;
  an attachment member mounted on the inner surface of the main wall for releasably securing the tool to the one of the two adjacent studs, said attachment member includes a magnet, said magnet keeping said main wall with said support surface spaced from the one of the two adjacent studs when the tool is secured thereto, said magnet being adjacent one of the first longitudinal end and a second longitudinal end of the main wall opposite the first longitudinal end; and
  a handle member mounted on and extending from the outer surface of the main wall, the handle member being adjacent the other one the first and second longitudinal ends opposite the magnet, wherein the handle member provides for a lever arm to allow release of the magnet and the tool from the one of the two adjacent studs.

In one embodiment, each of said first and second side walls extends beyond the outer surface and beyond the support surface to form a respective lateral guide.

In one embodiment, at least one of said first and second side walls includes a mark imprinted thereon and being levelled with the support surface for indication thereof.

embodiment, the magnet and the handle member are adjacent the first and second longitudinal ends of the main wall, respectively.

According to another aspect of the present invention, there is provided a kit comprising a horizontal portion of a frame defining an opening in a stud wall; and at least one tool for the installation of the horizontal portion between the two adjacent vertical studs of the stud wall, the horizontal portion and the at least one tool being as defined hereinabove.

In one embodiment, the kit includes two of said at least one tool for supporting a respective end of the horizontal portion when releasably secured to a respective one of said two adjacent vertical studs.

In one embodiment, the stud wall has the two adjacent vertical metallic studs spaced from one another by a predetermined distance and each having a stud width, the horizontal portion comprising an elongate body including at least a wooden bottom wall secured to first and second wooden end walls opposite to one another, the elongate body having a body length generally equal to the predetermined distance and a body width generally equal to the stud width, the first and second end walls being securable to the two adjacent studs.

Conveniently, the body width being one of the notional 2×6, 2×4 or 2×3 stud widths.

Conveniently, the elongate body includes a wooden lateral wall generally perpendicular to the bottom wall and extending between the first and second end walls, said lateral wall being secured to the bottom wall and to the first and second end walls and defining a body height, the body height being one of the notional 2×6, 2×4 or 2×3 stud widths.

Conveniently, the elongate body includes first and second wooden lateral walls generally perpendicular to the bottom wall and extending between the first and second end walls, said first and second lateral wall being secured to the bottom wall on opposite sides thereof and to the first and second end walls and defining a body height, the body height being one of the notional 2×6, 2×4 or 2×3 stud widths.

In one embodiment, the body length is one of 26, 28, 30, 32, 34, 36 and 38 inches.

In one embodiment, the body height is different than the body width.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, in which similar references used in different Figures denote similar components, wherein:

FIG. 2 is a partially broken enlarged view taken along line 2 of FIG. 1, showing the tool positioned on the metallic vertical stud and supporting a longitudinal end of the horizontal portion of the frame;

FIG. 3 is a front top perspective view of the installation tool of FIG. 2, showing the magnetic attaching member for momentarily supporting the tool on the metallic vertical stud;

FIG. 4 is a view similar to FIG. 1, showing the horizontal portion rotated sideways to now extend between two smaller size metallic vertical studs; and FIG. 5 is a view similar to FIG. 1, showing the horizontal portion extending between two wooden vertical studs of a frame and supported by two installation tools in accordance with another embodiment of the present invention.

DETAILED DESCRIPTION OF THE INVENTION

Figure 1:
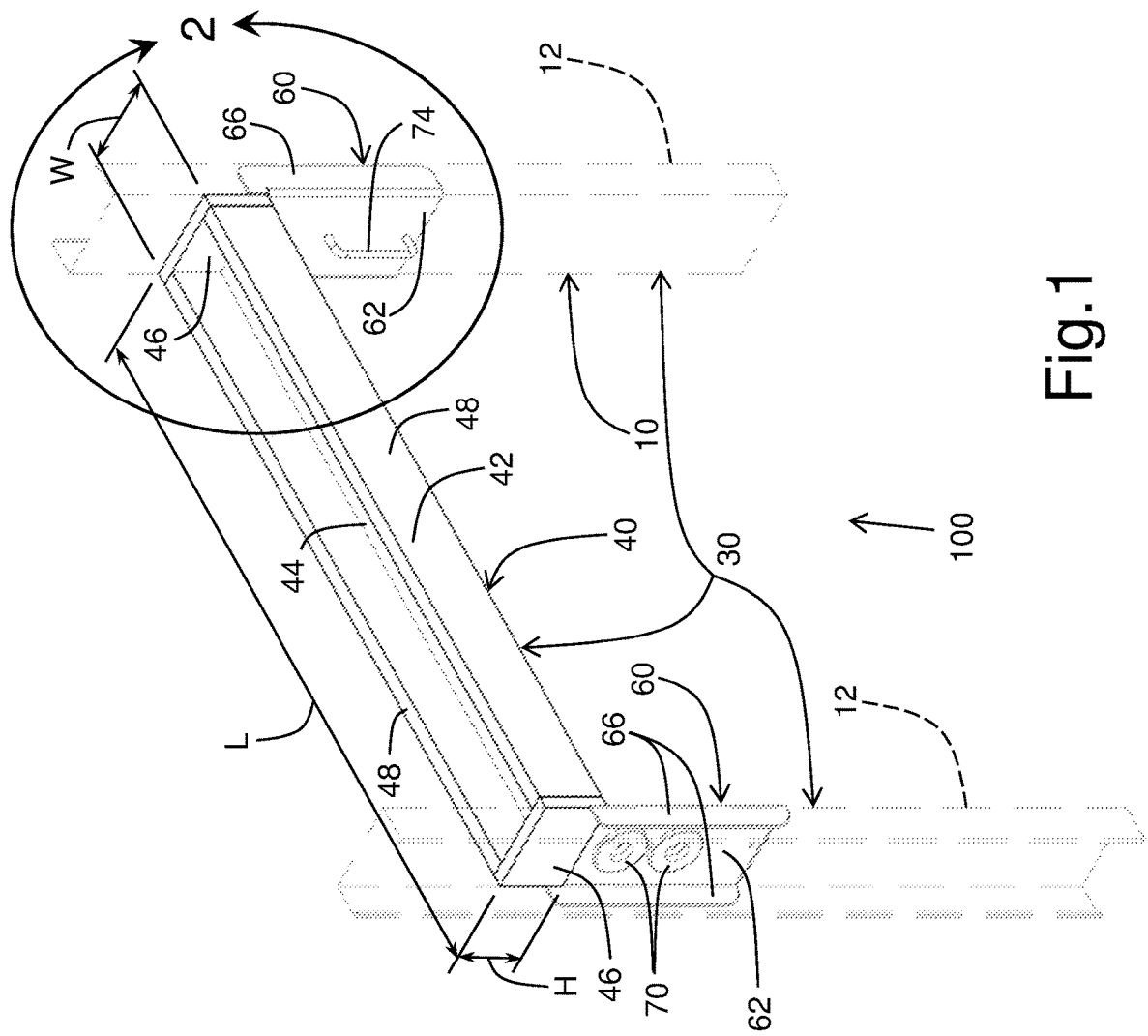
FIG. 1 is a partially broken schematic top perspective view of a horizontal portion of a frame supported by two installation tools in accordance with an embodiment of the present invention, showing the horizontal portion held in position between adjacent metallic vertical studs by respective installation tools releasably mounted on the respective studs.

With reference to the annexed drawings the preferred embodiment of the present invention will be herein described for indicative purpose and by no means as of limitation.

Referring now to FIGS. 1, to 3, therein is shown, in accordance with an embodiment of the present invention, a horizontal portion 40 of a frame 30 in abutment with two adjacent vertical studs 12 of a stud wall 10 and supported by two tools 60 for the installation of the horizontal portion 40 with the vertical studs 12. Referring more specifically to FIG. 1, although not entirely illustrated, the stud wall 10 is a typical rough wall structure including a plurality of spaced apart vertical studs 12, usually metallic studs in commercial and condominium buildings (as depicted in FIGS. 1-4) and wooden in residential constructions (as depicted in FIG. 5), and only two adjacent ones of the vertical studs 12 are shown in FIG. 1 in stippled lines. All vertical studs 12 of a same stud wall 10 have a common stud width, namely 5.5 inches, 3.5 inches or 2.5 inches, from the typical notional 2×6, 2×4 or 2×3 studs used in building walls. Typically, the opening defined by the frame 30 is generally between two adjacent vertical studs 12 of the stud wall 10 spaced from one another by a predetermined distance (such as commonly used 26, 28, 30, 32, 34, 36 or 38 inch wide doors, for examples, or any other dimension for a window opening and the like) and the body length L of the elongate body 42 of the horizontal portion 40 is generally equal to that predetermined distance.

In the embodiment shown in FIG. 1, the vertical studs are typical 2×4 (inches) studs 12, such that the horizontal portion 40 as a typical body width W generally equal to the stud width of about 3.5 inches, and a height H generally sufficient to be rigid, stiff and resistant enough to have a door, window or the like attached thereto.

More specifically shown in FIG. 2, a longitudinal end of the horizontal portion 40 (shown in stippled lines), such as a doorway header (or window header, window sill or the like), of the frame 30 is supported by the installation tool 60 removably secured to the metallic vertical stud 12 (shown in dotted lines), a portion of which is also part of the frame 30.

The installation tool 60 typically includes a main wall 62 defining an outer surface 62o and an inner surface 62i thereof, and a support surface 64. First and second side walls 66, typically parallel to one another, depend, generally perpendicularly, from the main wall 62 away from the inner surface 62i. The main wall 62 and the two side walls 66 typically form an open channel for typically tightly receiving the adjacent metallic stud 12 therein. The support surface 64, typically adjacent a first longitudinal end 63' of the tool 60, extends at least partially, and preferably entirely between the two side walls 66, to abuttingly receives a longitudinal end of the elongate body 42 thereon. The two side walls 66 typically extend beyond the support surface 64 to form lateral guides 68 or ears and hold the supported end of the horizontal portion 30 there between and in alignment with the vertical stud 12. An attachment member 70, such as magnets in this case for use with metallic studs 12, are mounted on one of the main wall 62 (as shown in FIGS. 1 to 4) and the side walls 66 to releasably and firmly secure the tool 60 to the metallic stud 12. In order to allow a practical installation of the tool 60 before the horizontal portion 40 is positioned thereon, a mark 72 imprinted (etched, engraved, printed or the like) on at least one, but preferably both side walls 66 is provided to indicate thereon the position of the support surface 64. This mark 72 is provided to easily position the tool 60 of the vertical stud 12 when using a laser alignment device (not shown) or the like to set the level of the horizontal portion at the predetermined height along the stud 12. A handle member 74 is also provided for easy handling of the installation tool 60.

Although the support surface 64 might seem to be too narrow to support the horizontal portion 30, and typically the bottom wall 44 thereof, the fact that the main wall 62 is typically spaced from the stud 12 due to the size of the magnets 70 (better seen in FIG. 3) helps in providing for an adequate support.

In addition, the illustrated tool 10 typically has the magnet(s) 70 adjacent one of the first longitudinal end 63' and a second longitudinal end 63" of the main wall 62 opposite the first longitudinal end 63', and preferably adjacent the first longitudinal end 63'. The handle member 74 is mounted on and extends from the outer surface 62o of the main wall 62, typically adjacent the other one the first 63' and second 63" longitudinal ends opposite the magnet(s) 70, and preferably adjacent the second longitudinal end 63". In such configuration, the relative longitudinal positioning on the main wall 62 of the handle member 74 relative to the magnet(s) 70 provides for a lever arm (schematically indicated as distance D in FIG. 3) to a pulling force P applied on the handle member 74 by a user to help release the magnet(s) 70 from the metallic stud 12.

The fact that the handle member 74 is also preferably longitudinally opposite the magnet(s) 70 and the support surface 64 allows for the above-mentioned lever arm to ease in the positioning of the tool 60 on the vertical stud 12 with the support surface 64 in alignment with a laser projection (not shown) on the metallic vertical stud 12 projected by a positioning indicator (not shown) such as a laser alignment device or the like.

The horizontal portion 40 is typically formed of an elongate body 42 that includes at least a bottom wall 44 and first and second end walls 46. Typically, in order to structurally reinforced the rigidity of the body 42, at least a first, but preferably first and second lateral walls 48 extend between the two end walls 46 and are secured thereto, and to the bottom wall 44. The elongate body 42 has a body length L generally equal to the predetermined distance between the two vertical studs 12 it is mounted on, and a body width W generally equal to the stud width. Once the horizontal portion 40 is properly positioned, at the required height, the two end walls 46 are secured to the two adjacent metallic studs 12, using a securing means (not shown), such as screws, nails or the like, typically coming from the inside of the metallic studs 12. Although other materials can be considered by one skilled in the art, the different walls 44, 46, 48 of the elongate body 42 are typically made out of wooden material such as conventional pieces of plywood (wood veneer) material, which could eventually be treated against fungus, moisture and/or even fire.

In the embodiment of the horizontal portion shown in FIGS. 1 and 2, the body width W is generally 3.5 in and the two lateral walls 48 typically have a height H of generally 2.5 in. This configuration allows for a same horizontal portion 40 to be used with conventional 2×4 vertical studs 12, as illustrated, and with conventional 2×3 vertical studs, when rotated ninety degrees (90°) about a longitudinal axis of the elongate body 42, in which one of the two lateral walls 48 becomes a new bottom wall. In fact, as illustrated in FIG. 4, the elongate body 42 of FIG. 1 has been rotated 90° sideways to fit with and between two adjacent 2×3 metallic vertical studs 12' of the stud wall 10' and defining the frame 30', with the new width W' and height H' corresponding to the height H and width W of FIG. 1, respectively. In this configuration, the same tools 60 can be used, even though they are slightly too wide, and releasably secured to the respective metallic stud 12' via their magnets 70.

Referring to FIG. 5, there is shown the embodiment 40 of the horizontal portion of the frame 30" supported by two similar tools 60" releasably secured to the respective conventional 2×4 wooden studs 12", via their attachment members (such as clamps, screw or the like—not shown).

In accordance with an embodiment of the present invention, there is also provided a kit 100, 100" including at least one horizontal portion 40 of a frame 30, 30', 30" defining an opening in a stud wall 10, 10', 10", as described hereinabove, and at least one, but preferably two tools 60, 60" for the installation of the horizontal portion 40 between two adjacent vertical studs of the stud wall 10, 10', 10". Typically, the horizontal portion 40 is supported at both longitudinal ends thereof adjacent the two studs 12, 12', 12" by the two tools 60, 60", at the required height. Then the horizontal portion 40 is then secured to the two studs 12, 12', 12" before the tools 60, 60" are removed therefrom.

Although the present invention has been described with a certain degree of particularity, it is to be understood that the disclosure has been made by way of example only and that the present invention is not limited to the features of the embodiments described and illustrated herein, but includes all variations and modifications within the scope of the invention as hereinabove described and hereinafter claimed.

I claim:

1. A tool for the installation of a horizontal portion of a frame between two adjacent vertical metallic studs, the tool comprising:
    a main wall defining an outer surface and an inner surface thereof, a first longitudinal end of the main wall including a support surface for supporting a longitudinal end of the horizontal portion thereon;
    first and second side walls being parallel to one another and depending from the main wall away from the inner surface, the main wall and the first and second side walls forming an open channel for removably receiving one of the two adjacent studs therein, the support surface extending at least partially between the first and second side walls;
    an attachment member mounted on the inner surface of the main wall for releasably securing the tool to the one of the two adjacent studs, said attachment member includes a magnet, said magnet keeping said main wall with said support surface spaced from the one of the two adjacent studs when the tool is secured thereto, said magnet being adjacent one of the first longitudinal end and a second longitudinal end of the main wall opposite the first longitudinal end; and
    a handle member mounted on and extending from the outer surface of the main wall, the handle member being adjacent the other one the first and second longitudinal ends opposite the magnet, wherein the handle member provides for a lever arm to allow release of the magnet and the tool from the one of the two adjacent studs.

2. The tool of claim 1, wherein each of said first and second side walls extends beyond the outer surface and beyond the support surface to form a respective lateral guide.

3. The tool of claim 1, wherein at least one of said first and second side walls includes a mark imprinted thereon and being levelled with the support surface for indication thereof.

4. The tool of claim 1, wherein said magnet and the handle member are adjacent the first and second longitudinal ends of the main wall, respectively.

5. A kit comprising:
    a horizontal portion of a frame for installing between two adjacent vertical studs of a stud wall; and
    at least one tool as claimed in claim 1 for the installation of the horizontal portion between the two adjacent vertical studs of the stud wall.

6. The kit of claim 5, including two of said at least one tool for supporting a respective end of the horizontal portion when releasably secured to a respective one of said two adjacent vertical studs.

7. The kit of claim 5, wherein the two adjacent vertical studs are spaced from one another by a predetermined distance and each having a stud width, the horizontal portion comprising an elongate body including at least a wooden bottom wall secured to first and second wooden end walls opposite to one another, the elongate body having a body length generally equal to the predetermined distance and a body width generally equal to the stud width, the first and second end walls being securable to the two adjacent vertical studs.

8. The kit of claim 7, wherein the body width being one of nominal 2×6, 2×4 or 2×3 stud widths.

9. The kit of claim 8, wherein said elongate body includes a wooden lateral wall generally perpendicular to the bottom wall and extending between the first and second end walls, said lateral wall being secured to the bottom wall and to the first and second end walls and defining a body height, the body height being one of the nominal 2×6, 2×4 or 2×3 stud widths.

10. The kit of claim 9, wherein said elongate body includes first and second wooden lateral walls generally perpendicular to the bottom wall and extending between the first and second end walls, said first and second lateral wall being secured to the bottom wall on opposite sides thereof and to the first and second end walls and defining a body height, the body height being one of the nominal 2×6, 2×4 or 2×3 stud widths.

11. The kit of claim 10, wherein the body height is different than the body width.

12. The kit of claim 9, wherein the body height is different than the body width.

13. The kit of claim 7, wherein said body length is one of 26, 28, 30, 32, 34, 36 and 38 inches.

* * * * *